United States Patent
Balzano

(10) Patent No.: US 6,347,915 B1
(45) Date of Patent: Feb. 19, 2002

(54) LOCK WASHER FOR THREADED FASTENERS

(76) Inventor: Alfiero Balzano, 11371 Monarch St., Garden Grove, CA (US) 92841

( * ) Notice: Subject to any disclaimer, the term of this patent is extended or adjusted under 35 U.S.C. 154(b) by 0 days.

(21) Appl. No.: 09/466,672

(22) Filed: Dec. 20, 1999

Related U.S. Application Data

(63) Continuation of application No. 09/134,991, filed on Aug. 17, 1998, now abandoned.

(51) Int. Cl.$^7$ ................................................. F16B 39/28
(52) U.S. Cl. ........................................ 411/149; 411/161
(58) Field of Search ................................ 411/149, 147, 411/160, 161

(56) References Cited

U.S. PATENT DOCUMENTS

| | | | | |
|---|---|---|---|---|
| 3,263,727 A | * | 8/1966 | Herpolsheimer | |
| 3,895,663 A | * | 7/1975 | Bashline | |
| 4,538,313 A | * | 9/1985 | Frieberg | |
| 4,571,452 A | * | 2/1986 | Giubileo | |
| 5,090,855 A | * | 2/1992 | Terry | |
| 5,626,449 A | * | 5/1997 | MvKinlay | |

* cited by examiner

Primary Examiner—Flemming Saether
(74) Attorney, Agent, or Firm—Roger A. Marrs

(57) ABSTRACT

A two-piece lock washer for use with a variety of fasteners wherein the lock washer itself includes a pair of components having opposite end opposing surfaces formed with a plurality of inclined ramps and locking faces so that when the components are pressed together, the ramps will ride upon each other as the fastener is turned until locking faces engage where locking is produced. The lock washer includes a central opening through which the shank of a fastener is passed and an exterior surface of the washer bears against the workpiece while the exterior surface of the other component bears against the head of the fastener. Thereby axial compression of the lock washer components causes the locking faces of the ramps to engage as the fastener is tightened against the workpiece. Backing off is prevented due to locking face engagement and the provision of radial ribs bearing against the fastening nut and the workpiece.

2 Claims, 1 Drawing Sheet

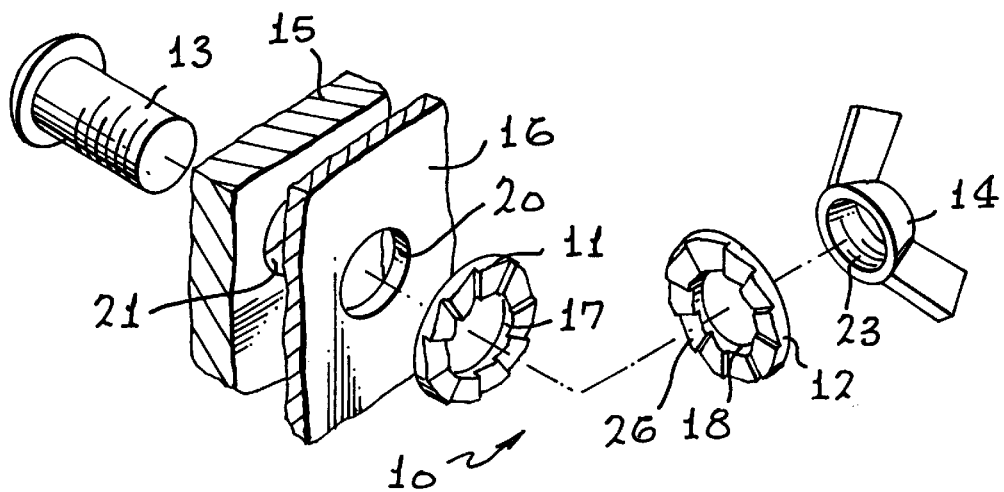
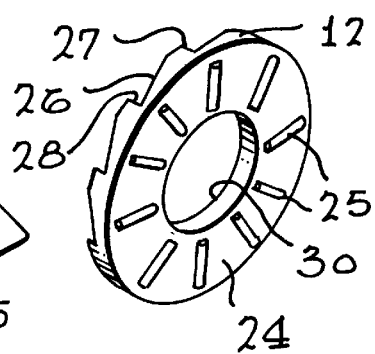
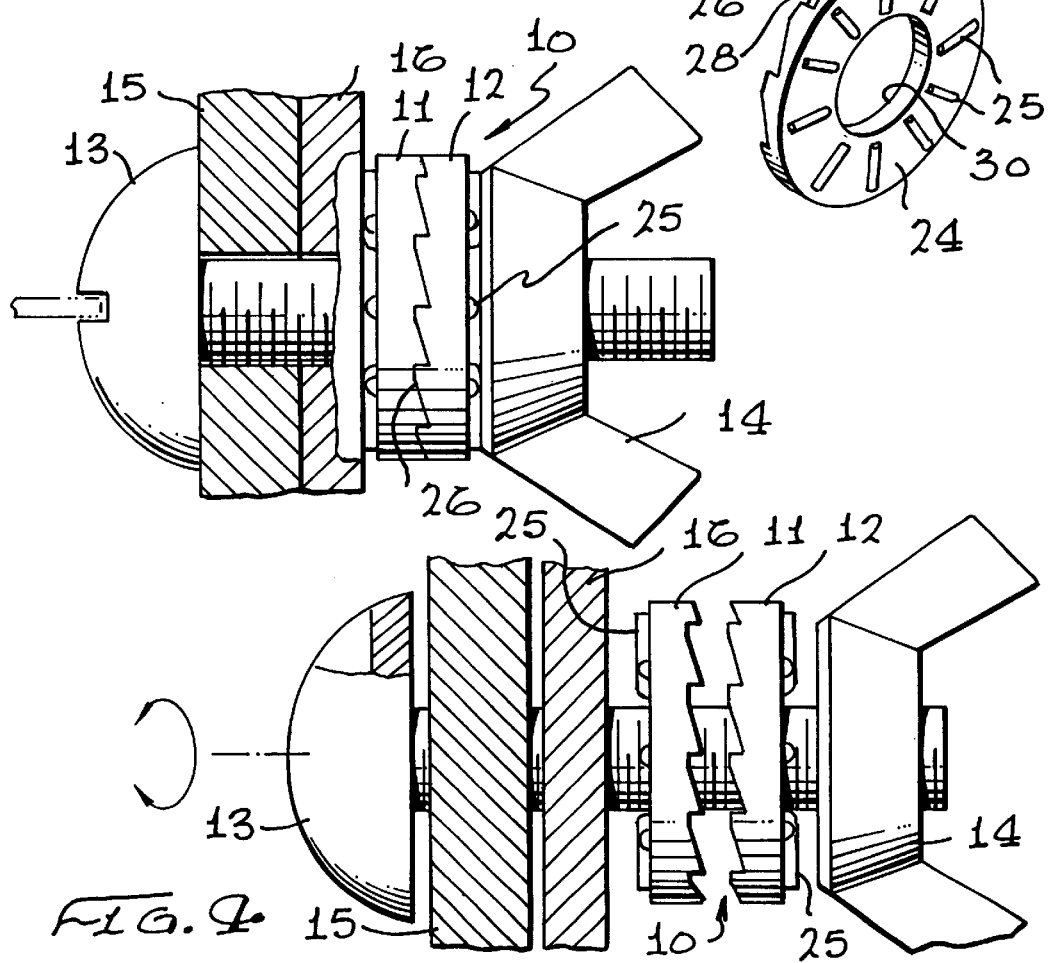

LOCK WASHER FOR THREADED FASTENERS

Priority claimed based on Ser. No. 09-134,991 filed Aug. 17, 1998 which is now abandoned.

BACKGROUND OF THE INVENTION

1. Field of the Invention

The present invention relates to the field of locking devices for fasteners, and more particularly to a novel lock washer useful in combination with a fastener which prevents the fastener from being withdrawn from its tightened position and yet which will permit removal of the fastener upon disassembling of the fastener itself.

2. Brief Description of the Prior Art

In the past, it has been the conventional practice to prevent fasteners from backing off or from loosening from a tightened installation or assembly by the use of deformable elastometric materials or by use of spring or segmented washers which are disposed between the head of the fastener and a workpiece. Problems and difficulties have been encountered when employing such conventional devices which stem from the fact that many times the fastener can be loosened through vibration of the workpiece or by inadvertent impacts received from surrounding components in the fastened environment. In some instances, a variety of sharpened projections, such as wedges or deformable lugs, have been incorporated into washers which dig and gouge into the head of the fastener or into the workpiece itself in order to provide a tightened situation. In these instances, the workpiece is often gouged to the point where the integrity of the workpiece is adversely affected and material fatigue sets in which reduces the strength of the workpiece at the fastening assembly.

Prior attempts to provide devices which prevents or retards the backing off of fastener components are disclosed in U.S. Pat. Nos. 3,895,663 and 5,090,855. However, these disclosures require side or peripheral faces or surfaces that include flats so that hand tools such as wrenches can be used to effect engagement of the washers or components. The latter discloses and requires that the peripheral face include hexagonal wrenching flats 24b which are used for turning purposes. The peripheral surfaces or faces should be ineffective for turning purposes and should not be used to independently rotate the components with respect to each other.

Therefore, a long-standing need has existed to provide a nondeformable lock washer which will provide a positive locking action so that a fastener assembly cannot be loosened from its tightened position. However, such a lock washer should permit disassembling of the fastening device from the workpiece only when desired by the user or workman.

SUMMARY OF THE INVENTION

Accordingly, the above problems and difficulties are avoided by the present invention which provides a novel two-piece lock washer for use with a variety of fasteners wherein the lock washer itself includes a pair of components having opposite end opposing surfaces formed with a plurality of inclined ramps and locking faces so that when the components are pressed together, the ramps will ride upon each other until reaching a locking face where lock engagement is produced. The lock washer includes a central opening through which the shank of a fastener is passed and an exterior surface of the washer bears against the workpiece while the exterior surface of the other component bears against the head of the fastener. Thereby axial compression of the lock washer components causes the locking faces of the ramps to engage as the fastener is tightened against the workpiece.

Therefore, it is among the primary objects of the present invention to provide a novel lock washer which will maintain a fastener in a tightened position but is yieldable for removal of the fastener when it is desired to be removed by the workman.

Another object of the present invention is to provide a lock washer which gives positive locking action to an installed fastener and which can only be unlocked when the workman removes the fastener from the workpiece.

Yet another object of the present invention is to provide a novel lock washer for fasteners having a positive locking action which prevents and prohibits untightening of a fastener from its tightened position.

Still a further object of the present invention is to provide a two-component lock washer having interfacing inclined ramp surfaces and locking faces which permit a fastener to be tightened with a workpiece and thereafter prevents untightening of the fastener which might normally occur due to vibration of the workpiece or other impacting or jarring conditions.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is an exploded perspective view showing the novel lock washer of the present invention preparatory for installation of a fastener on a workpiece;

FIG. 2 is an enlarged perspective view showing one component of the two-component lock washer as illustrated in FIG. 1;

FIG. 3 is an enlarged sectional view of a tightened fastener with the inventive lock washer of the present invention in a locked condition;

FIG. 4 is a view similar to the view of FIG. 3 illustrating the lock washer in an unlocked position when the fastener is loose and untightened.

DESCRIPTION OF THE PREFERRED EMBODIMENT

Referring to FIG. 1, the novel lock washer of the present invention is shown in the general direction of arrow 10 and the lock washer is intended to be used with a fastener, such as a bolt 13 cooperating with a nut 14 in order to hold a workpiece together, such as represented by plates 15 and 16. The lock washer 10 includes a pair of components 11 and 12. The lock washer components include central openings 17 and 18 associated with components 11 and 12 respectively and these openings are in alignment so as to be coaxially disposed with respect to openings 20 and 21 in the plates 16 and 15 respectively. Therefore, for assembly and tightening of the fastener, the shank of bolt 13 is introduced through the coaxial and coextensive openings 21, 20, 17 and 18 so as to threadably engage with the threaded receptacle 23 of nut 14. For purposes of illustration, a bolt and nut are shown but it is to be understand that another fastener and fastener devices may be deployed.

Referring now in detail to FIG. 2, component of the washer 10, represented by the numeral 12, is illustrated showing that the washer components are circular and present an outer surface 24 on which a plurality of rib elements, such as element or rib 25, is carried. The elements or ribs are radiating outwardly from the central axis of opening 18 so that the ribs are not in parallel relationship but they are in spaced-apart relationship. It can also be seen that the opposite side or face from surface 24 includes a plurality of inclined ramps, such as incline ramp 26 that terminates at opposite ends in locking notches, such as notch 27 at one end of ramp 26 and notch 28 at the other end of ramp 26. Since a series of inclined ramps and notches are provided on the inner face of the washer component, a continuous series of ramps are provided in a circular contour. The inner face of the lock washer component 12 is broadly indicated by the numeral 13 and it is to be understood that the outer face is represented by the numeral 24.

Referring now in detail to FIG. 3, a completely assembled and tightened fastening arrangement is illustrated so that the workpieces, represented by sheets 15 and 16, are joined together by the fastener 13 in threaded engagement with wing nut 14. The tightened fastener and workpiece are locked in position so that untightening cannot be inadvertently achieved even though the workpiece sheets are exposed to severe vibration or impacts which would normally cause the fastener to become loose. The lock washer 10 is disposed between one surface of the workpiece, such as an exposed surface of sheet 15, and the underside of the nut 14. When locked, the ribs 25 associated with the outer face or surface of each washer component 11 and 12 bear against the respective workpiece and nut so that rotation cannot occur. Rotation is also prevented by means of mating the respective incline surfaces 26 and notches such as notches 27 and 28 between the opposing inner faces of the components 11 and 12. By this means, neither the bolt 13 nor the nut 14 can be removed since the lock washer 10 will not rotate or permit relative movement between the threaded shank of the bolt 13 and the threaded bore or receptacle of the nut 14.

Referring now in detail to FIG. 4, the fastener and the lock wash assembly are illustrated in a loose condition preparatory for assembly to fasten and hold the workpiece components 15 and 16 together. Initially, the components and the fastener bolt and threaded shank are arranged in alignment and the threaded shank terminates with the nut threaded receptacle 23. As the nut is rotated on the threaded shank, the components are drawn together to where the head of the fastener bears against the exposed surface of sheets 16 while the components of the lock washer 10 are also drawn together to the extent that the exposed surface of workpiece sheet 16 bears against the ribs 25 of the component 11 while the face of the nut 14 bears against the ribs 25 of the component 12. As the components 11 and 12 are forced together by further rotation of nut 14, the inner faces of the components will bear against one another and the inclined ramps will ride upon one another until the respective lock notches 27 and 28 fall into mated relationship between the two components in a similar fashion to that of a ratchet mechanism. Once such mating has occurred, rotation is terminated and the components 11 and 12 appear meshed, as shown in FIG. 3. Further rotation is prohibited since there is no further room for compression and backing off of the nut 14 is prevented because of the notched interlock between the inclined ramps and the radial bearing of ribs 25 against the surface of worksheet 16 and the face of nut 14. Thus, the lock washer is jammed into its closed position and the nut 14 cannot be backed away from the washer.

The only way that the fastening assembly can be disassembled or the tightening released, is by inserting a tool into the slot on the head of bolt 13 and rotating the fastener itself to the point where the threaded shaft is extracted from the nut 14. At this time, the components of the lock washer can be separated and the assembly can completely be removed.

It is to be emphasized that the components 11 and 12 are round or circular in configuration having the same diameter with a continuous and uninterrupted smooth outer or side peripheral face. The peripheral faces of the components are not only coaxial but are coextensive when the components are disposed on the threaded shank of the fastener. The smooth and round peripheral faces or surfaces are inoperative for engaging, joining, or pressing the locking faces together.

Therefore, it can be seen that a simple set of washer components comprising the lock washer 10 can be placed over a bolt and against the workpiece surface intended to be held. Compression by nut 14 is achieved by rotating the nut on the threaded shank until the two components of the lock washer are compressed and locked in place by applying pressure on the nut 14. The combination illustrated locks even tighter when attempts are made to remove the nut 14. As a single washer component rides up on the ramp surface of the other component, locking occurs against unauthorized removal. The only way to remove the fastener is by turning the threaded fastener or by cutting the assembly apart which, of course, destroys the components. The washers may be fabricated in many different ways from many different materials and the required locking pressures, torque or tension, can be modified depending on the materials used for the washer components and on the length and degree of incline of the ramp surfaces. The application of use dictates the specification and material required and the vibration and shock withstanding characteristics.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A lock washer comprising:
   a pair of components in coaxial relationship along a common axis and having opposing inner surfaces with each of said surfaces provided with a plurality of inclined smooth surfaced ramps;
   each of said ramps terminating at a raised linear edge end with a downwardly extending vertical locking face;
   said components raised linear edge ends ride in sliding relationship upon respective ones of said inclined smooth surfaced ramps of said opposing component surface ramps until said locking faces of adjacent ramps of said components engage;
   a plurality of rounded, non-pointed, elongated raised ridges on an exterior or outer surface of each of said components opposite to said inner surface provided with said ramps;
   a central opening in each of said components coaxially disposed with respect to each other for insertably receiving a threaded shank of a fastener;
   said components having a circular edge-marginal region coaxial with and in spaced-apart relation with said central opening and said circular edge-marginal region defined by a peripheral edge;

said raised ridges disposed in fixed spaced-apart relationship and that extend radially outwardly from said central opening at an angle with respect to each other, said elongated ridges having vertically extending end faces located respectively inwardly from said peripheral edge and outwardly from said opening; and said components are circular in configuration having the same diameter and with a continuous and uninterrupted smooth peripheral face wherein said smooth peripheral face of each component is coextensive with said smooth peripheral face of the other component of said pair of components and wherein said pair of components are non-operative for effecting engagement or disengagement with respect to each other.

2. In a fastener locking arrangement with a fastener having a threaded shank with a turning nut movebly carried thereon, the improvement which comprises the combination of:

a pair of lock washer components coaxially disposed on said threaded shank of said fastener;

each of said components having an inner surface provided with a series of inclined ramps with each ramp terminating in a raised linear edge portion having a downwardly depending vertical lock face immediately adjacent to said next inclined ramp in said series;

said inner surfaces of each of said components arranged in opposition with respect to each other to be pressed together to engage adjacent ones of said lock faces together as said nut is turned on said threaded shank;

each component having an exterior surface carrying a plurality of rounded, non-pointed, elongated elements extending radially in fixed spaced-apart relationship engageable with said turning nut and said fastener respectively in a jamming relationship so as to prevent back-off of said components from each other;

said components include a central opening for accommodating insertion of said threaded shank;

said raised elements are elongated ridges radially disposed outwardly from said central opening extending to an edge-marginal region defined by a peripheral edge of each component;

a workpiece having an opening occupied by said threaded shank;

said fastener having a head at one end of said threaded shank and said turning nut at the other end thereof with said workpiece between said fastener head and said pair of components wherein said pair of components separate said turning nut from said workpiece;

said components are circular in configuration having the same diameter and with a continuous and uninterrupted smooth outer peripheral face and with said smooth outer peripheral faces being coextensive when said pair of components are coaxially disposed on said threaded shank of said fastener;

said smooth outer peripheral faces being inoperative for pressing said locking faces together; and said elongated elements having vertically extending end faces located respectively inwardly from said peripheral edge and outwardly from said opening;

said turning nut on said threaded shank of said fastener being solely operable to press said locking faces together.

* * * * *